United States Patent
Graham et al.

[11] Patent Number: 5,854,445
[45] Date of Patent: Dec. 29, 1998

[54] THERMALLY EFFICIENT POWER BUSWAY SYSTEM WITH INTEGRAL CLAMPING MECHANISM

[75] Inventors: Eric J. Graham, Farmington; Louis A. Rosen, Wallingford; Ira Goldman, Waterbury; Jeffrey Scott Berliner, New Britain; Thomas D. Collins, West Simsbury, all of Conn.; Clarence W. Walker, Selmer, Tenn.

[73] Assignee: General Electric Company, Schenectady, N.Y.

[21] Appl. No.: 692,564

[22] Filed: Aug. 6, 1996

[51] Int. Cl.⁶ ............................................. H02G 5/06
[52] U.S. Cl. ............... 174/99 B; 174/72 B; 174/133 B; 248/68.1
[58] Field of Search ............................ 174/99 B, 133 B, 174/72 B, 71 B, 16.2, 149 B, 70 B, 68.2, 96, 97, 98; 248/68.1

[56] References Cited

U.S. PATENT DOCUMENTS

| | | | |
|---|---|---|---|
| 2,216,870 | 10/1940 | Adam | 174/99 |
| 2,356,006 | 8/1944 | Samer | 174/99 |
| 2,963,537 | 12/1960 | Carlson | 174/99 B |
| 3,088,994 | 5/1963 | Cataldo | 174/99 |
| 3,096,131 | 7/1963 | Adams | 174/99 B |
| 3,315,132 | 4/1967 | Lucas | 317/99 |
| 3,346,687 | 10/1967 | Giger et al. | 174/68 |
| 3,426,802 | 2/1969 | Fork | 174/96 |
| 3,555,293 | 1/1971 | Shannon | 307/147 |
| 4,145,853 | 3/1979 | Bridwell | 52/221 |
| 4,195,198 | 3/1980 | Krause | 174/945 |
| 4,673,229 | 6/1987 | Jorgensen et al. | 439/207 |
| 4,678,253 | 7/1987 | Hicks, Jr. et al. | 439/210 |
| 4,760,634 | 8/1988 | Rapp | 29/509 |
| 4,804,804 | 2/1989 | Hibbert et al. | 174/16.2 |
| 4,929,801 | 5/1990 | Hibbert | 174/16.2 |
| 5,552,222 | 9/1996 | Bolon et al. | 428/379 |

OTHER PUBLICATIONS

U.S. Application No. 08/411,256 Filing Date Mar. 27, 1995 Electric Power Busway System Connector Joint.
Metal Forming Magazine 1992 Auto Parts Assembled without Fasteners.

*Primary Examiner*—Bot L. Ledynh
*Assistant Examiner*—Dhiro R. Patel
*Attorney, Agent, or Firm*—Fishman, Dionne, Cantor & Colburn; Carl B. Horton

[57] ABSTRACT

An electric power busway system comprises a bus bar support housing with the opposite side plates of the housing shaped with troughs to hold the bus bars in their relative positions, preventing the bus bars from moving towards or away from one another and providing the necessary short-circuit protection and bending resistance. The metal side plates are preferably fastened together without the use of fasteners or the need for welding, through the use of a punch and die tool set. A protective insulating sheet is sandwiched between the insulated bus bars and the housing to protect the bus bar insulation coating from ruptures or tears. Clamping blocks are provided outside the protective busway housing to apply friction on the bus bars within, keeping them from sliding out of the housing assembly. The integral busway housing and clamping serve as a ground conduction facility, with the clamping blocks providing a mechanism to connect the busway section to an adjoining section.

23 Claims, 9 Drawing Sheets

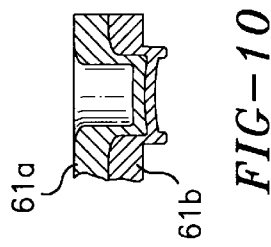
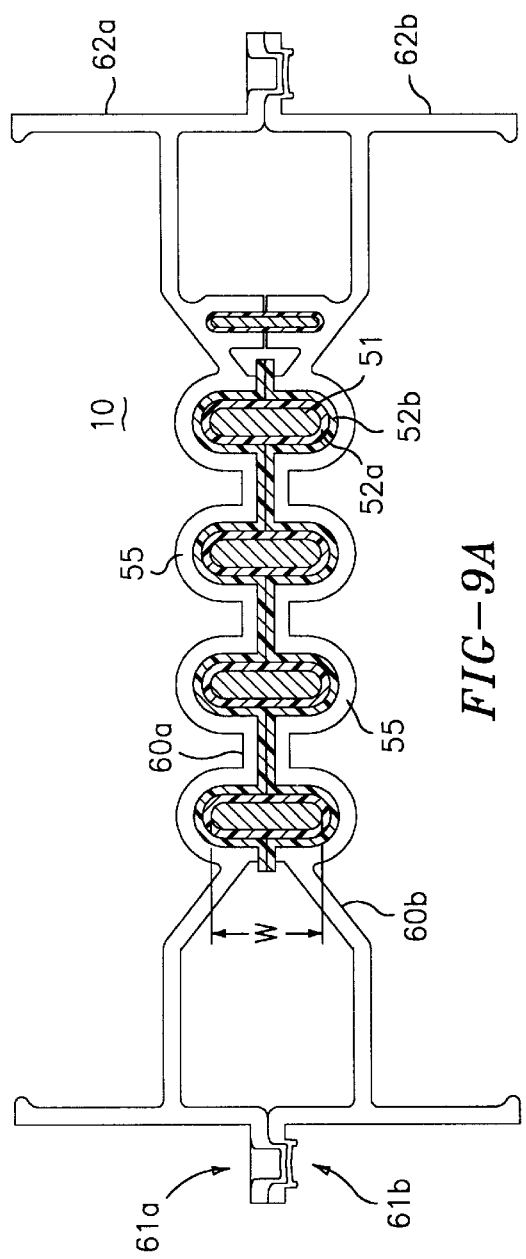
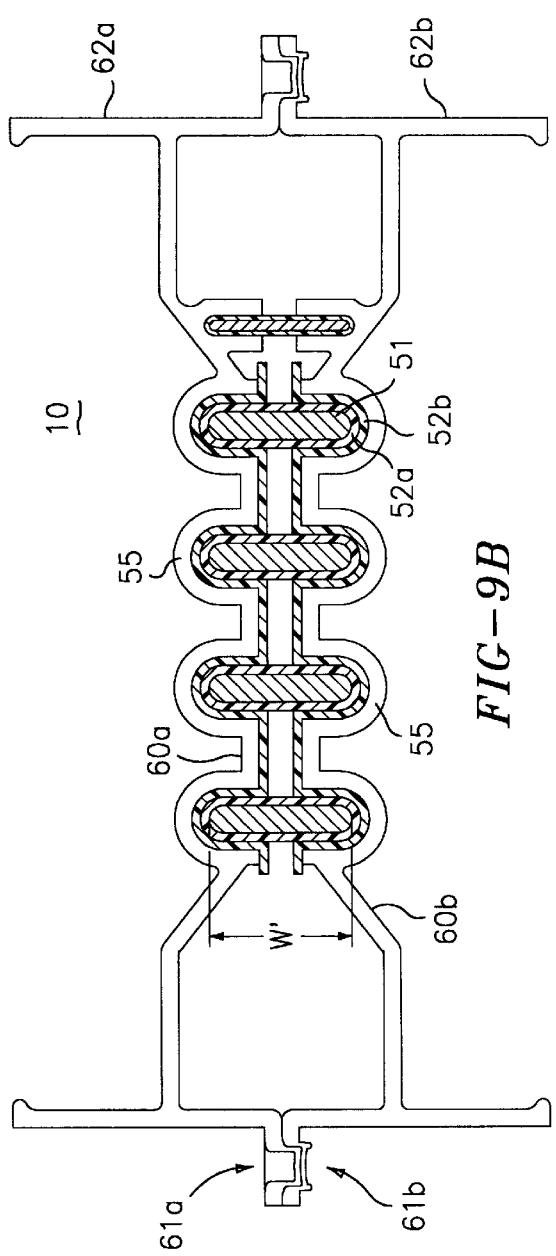

THERMALLY EFFICIENT POWER BUSWAY SYSTEM WITH INTEGRAL CLAMPING MECHANISM

BACKGROUND OF THE INVENTION

Our invention relates to electric power distribution systems of the type commonly referred to as "busways," which embody enclosed ducts or housings for the multiple bus bars within.

Sections of a power busway used within an electric power distribution system typically consist of several major components including bus bar conductors, a protective duct or housing arrangement, and plug outlets for power distribution. In accordance with state and local electric code, the system must include a ground conductor. Additionally, busway sections must join with neighboring sections through a common interface or joint. Busway systems can be subjected to external forces or short-circuit conditions where magnetic repulsion forces are generated between the individual bus bars imposing distortion stresses upon the system.

Busway systems must be designed and built to withstand such external forces or vibrations caused by short-circuit stresses. One approach is to support the bus bars at intervals in such a way as to maintain the bus bars in proper relationship to each other and to the enclosures of the bus bars. U.S. Pat. No. 2,356,006 entitled "Bus Bar Supporting Clamp" provides for supporting clamp frames arranged at various intervals lengthwise of the bus duct. Screws secure the frames to the bus bars and to the bus duct. U.S. Pat. No. 3,088,994 entitled "Clamped Busway Structure" describes a busway system in which the bus bars are clamped in place by suitable formations in the support plates. The plates are secured to the housing, which is a multipiece metallic construction, by rivets. U.S. Pat. No. 3,315,132 entitled "Bus bar Power Distribution Systems" describes a bus bar distribution system with frames spaced at intervals along the length of the bus bar conductors providing support for the bus bars to withstand the short-circuit stresses. U.S. Pat. No. 4,804,804 entitled "Thermally Efficient Power Busway Housing" describes the use of insulated bolts to tightly hold together the bus bars and the extruded aluminum housing side plates. All of the above solutions are costly and difficult to install, requiring the use of multiple fasteners or support frames.

One problem often experienced in the design and construction of a busway system is keeping the straight bus bars in their permanent positions in the housing. Individual bus bars in a busway system are subject to thermal expansion because of the heat generated therein. Because construction of busway systems. Busway housing pieces used in the construction of busway systems are typically spot-welded together or fastened by bolts, screws, or rivets.

One requirement of busway assemblies is to provide ground path conductivity across busway sections through and across joint areas. U. S. Pat. No. 4,673,229 entitled "Electrical Distribution System with an Improved Housing" describes a busway system with the bus bars being enveloped or surrounded with a ground bus. The ground bus, together with a pair of side rails, form a housing for the bus bars. Other busway systems use the conductive property of the steel busway enclosures to provide the required ground conductor.

Bus bar conductors within a busway system are generally long rectangular bars of copper or aluminum material with each individual bar electrically insulated to maintain electrical isolation between the individual phases, as well as between the phase conductors and the neutral conductor. The aforementioned U.S. Pat. No. 4,804,804 describes a plurality of copper or aluminum bus bars insulated from each other by an epoxy coating. The use of an epoxy resin as an insulative coating for the bus bars beneficially results in good thermal transport from the bus bar conductors to the busway housing while maintaining the necessary electrical insulating properties therebetween. It has been found that the insulative coating becomes ruptured after the bus bars are in use for a period of time.

Bus bars in a busway system are subject to thermal expansion because of the heat generated therein by the electricity passing through them. They expand in different amounts due to the different degrees of heating. Because of the different expansion rates, bus bars slide or move longitudinally with respect to one another, sometimes causing the insulative coating to rupture. The coating may also rupture when the busway is subject to short-circuit conditions because the bus bars flex and separate under such conditions. It has also been found that after a period of time, the insulated bus bars tend to stick to the busway housing and to other bus bars if the bus bars are maintained by pressure, or when they are in intimate contact with each other. Such sticking or bonding of the bus bars to one another or to the housing duct further exacerbate the tearing of the insulative coating when the bus bars slide or move. The coating can also be easily torn or pierced by edges of the housing structure or by the clamps used to hold the bus bars in place. the bus bars undergo different expansion rates, they slide or move longitudinally within the housing. To prevent straight bus bars from sliding out of the busway; various solutions have been employed. One approach is bending the straight bus bars to the shape of the formed housing which prevent the bus bars from escaping the housing assembly. Another approach is drilling holes through the bus bars and busway housing and clamping all the pieces together through coinciding holes spaced at various intervals, as in the aforementioned U. S. Pat. No. 4,804,804 and U.S. Pat. No. 4,929,801 entitled "Thermally Efficient Ventilated Electric Busway System." The two patents describe the use of insulated bolts to hold the bus bars and the housing side plates together. This type of construction does not work well with small-width bus bars.

U.S. Pat. No. 2,216,870 entitled "Bus Duct" provides for insulator clamps held against the top of the busway section by nuts, with slots in the insulator clamps to hold and support the bars loosely until all are properly positioned, then the bus bars are clamped rigidly together in their permanent positions. U.S. Pat. No. 3,555,293, also entitled "Bus Duct," describes the use of a pair of side plates that are bolted together on opposite sides of the enclosed bus bars. The above solutions require the use of multiple fasteners or clamps.

A way to join metal plates without the use of mechanical fasteners or clamps is via the use of a punch and die tool set. An article in the 1992 issue of Metal Forming Magazine entitled "Auto Parts Assembled without Fasteners" described a process called "clinching," in which the joining elements or parts are joined together by the action of a punch and die, whereby the punch sinks through one sheet metal surface, melding it into the joining metal sheet or plate. This process is also known as "crimping," wherein there is a deformation or extrusion of one layer of metal plate, melding it into the joining metal plate, without any through-holes created in the metal plates as with other punch-and-die joining techniques such as stitching. U.S. Pat. No. 4,760,634 entitled "Method of Connecting Thin Plates" further describes a method and apparatus for connecting stacked thin plates or plate sections together using the "clinching" technique. The aforementioned Metal Forming article notes that joints using this method remain solid under the most rigorous vibration conditions, while joints done by spot welding and riveting methods fail the same endurance tests. The use of the above type of joints to fasten or connect thin metal plates is prevailing in the automobile industry, but has never been implemented in the One approach to further protect the bus bars and the insulative coating is to provide additional pieces of insulating sleeves wherever the bus bars come in contact with the clamp frames as described in the aforementioned U.S. Pat. No. 2,356,006. Similarly, U.S. Pat. No. 3,346,687 entitled "electric Power Busway Having Non-self Adhering Insulation Between the Bus Bars and Between the Housing and the Bus Bars," solves the tearing problem with multiple layers of coating. In between each adjacent pair of insulated bus bars, there is provided at least two layers or strips of material which does not adhere to itself When the bus bars move, the two strips slide against each other, with no damage to the insulative coating immediate to the bus bars. In order to protect the bus bar coating, the aforementioned U.S. Pat. No. 3,088,994 provides an auxiliary insulator in the regions where the bus bars are clamped by the housing, either by interposing the layers in between the bus bars and the clamping area or with an auxiliary insulator "embedded" in the coating. The above solutions are either expensive or difficult to apply with additional protective coatings for each individual bus bar, or with multiple pieces of insulative protective sleeves for each bus bar or for the contact areas between the bus bars and the support housing.

OBJECTS OF THE INVENTION

It is, therefore, an object of the present invention to provide a novel and improved busway housing that is simple and easy to assemble, and strong enough to keep the bus bars within in relative position and withstand distortion stresses.

A further object of this invention is to provide a novel clamping mechanism that is simple in construction, whereby the bus bars are maintained in position in the housing by direct clamping on the housing.

Still a further object of this invention is to provide a novel method to fasten the parts of the busway housing together.

It is another object of this invention to provide an internal ground wherein the internal ground is provided by means of the busway housing and clamping blocks.

It is still another object of this invention to provide a one-piece construction for an insulative protective layer for the bus bars that is simple and easy to install.

Further objects and features of the invention will be readily apparent to those skilled in the art from the following specification which includes the appended claims and drawings.

SUMMARY OF THE INVENTION

The invention, accordingly, comprises a bus bar support housing with the opposite side plates of the housing shaped with troughs to hold the bus bars in their relative positions, preventing the bus bars from moving towards or away from one another and providing the necessary short-circuit protection and bending resistance.

The present invention further provides a means to fasten the pieces of the busway housing together without the use of fasteners or the need for welding, through the use of a punch and die tool set, whereby the punch sinks through one sheet metal surface into the joining metal sheet or plate, resulting in a joint without any through holes created in housing.

Another feature of the present invention comprises a protective insulating plastic sheet which is sandwiched between the insulated bus bars and the housing, and is shaped to mate with the housing and the bus bar assembly.

Another aspect of the invention comprises clamping blocks which are located opposite each other outside the protective busway housing and used to hold the bus bars within, keeping them from sliding out of the housing assembly. Threaded screws extend through the clamping blocks and the protective housing, directly clamping and applying pressure on the housing pieces, holding the bus bars tightly in place.

The present invention further provides a ground conducting means to connect a busway section to an adjoining section. The threaded holes on the top of the clamping mechanism are used for fasteners, attaching a cover over a removable joint connecting the bus bar phases and ground. The cover connects one section of busway with an adjoining section. In addition, the threaded holes on the side of the clamping blocks are attached to the joint splice plates which are connected to the joint sides of the adjacent busway sections, thus providing additional ground conductivity.

BRIEF DESCRIPTION OF THE DRAWINGS

FIGS. 9A and 9B are cross-sectional views similar to FIGS. 3A and 3B, illustrating a variation of the instant invention for the housing assembly in FIG. 8.

FIG. 10 is a cross-sectional view of a joint where two opposing metal plates or rails of the instant invention are joined together.

DESCRIPTION OF THE PREFERRED EMBODIMENT

Figure 1:
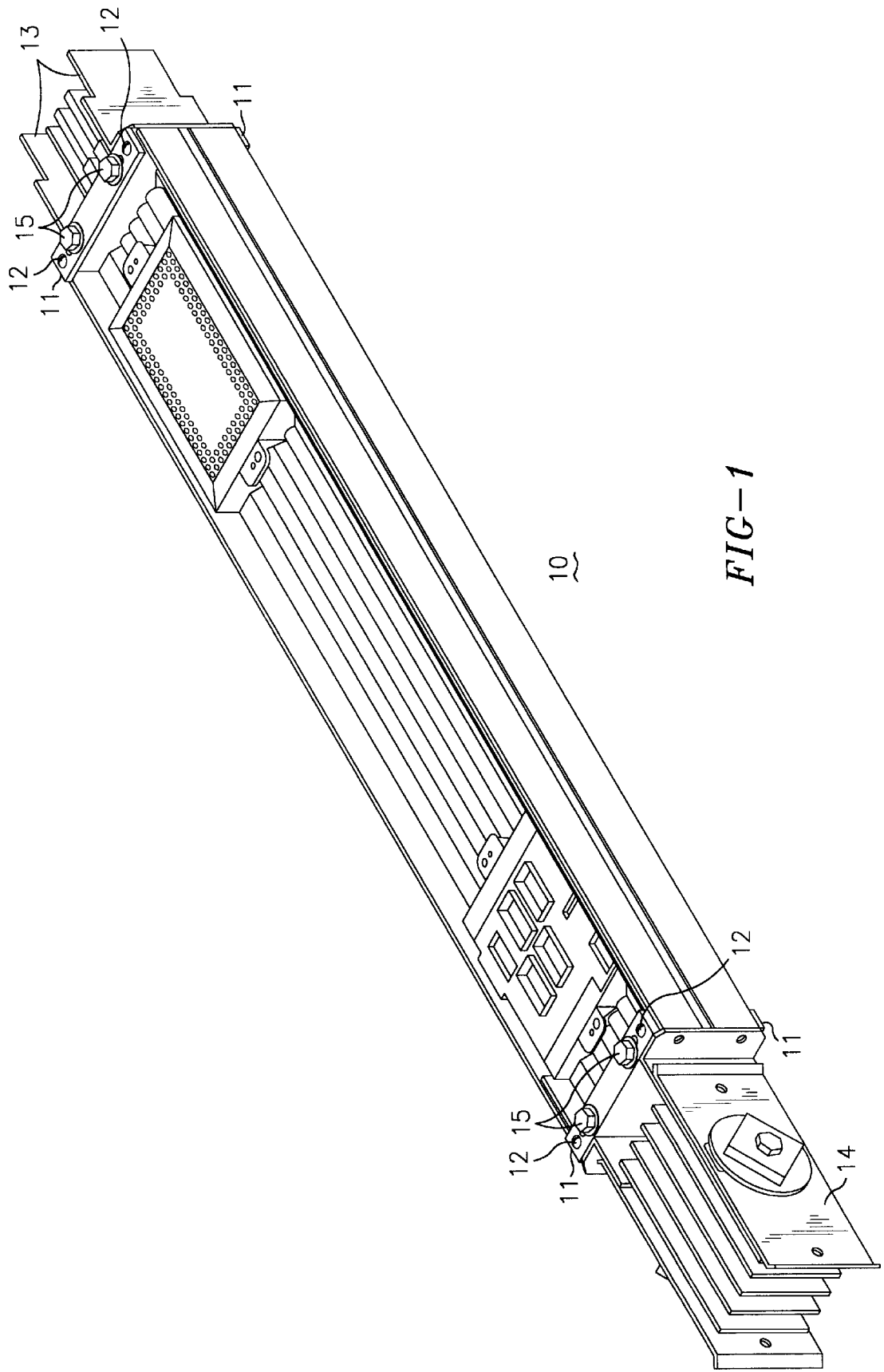
FIG. 1 is an isometric view of a busway section utilizing an integral bus bar clamping mechanism on both ends of the section, assembled joint braces and joint sides, a removable joint, and plug outlets.

FIG. 1 demonstrates the application of the integral busway clamping mechanism of the instant invention into the intended environment of a typical power busway distribution section 10. In this figure, there are two clamping mechanisms, one on each end of the busway section 10. Each clamping mechanism consists of two clamping blocks 11 and two clamping screws 12. Also connected to the ends of a typical busway section are joint sides 13 and a removable joint, preferably a splice-plate joint 14 as described in the co-pending U.S. patent application Ser. No. 08/411,256, filed on Mar. 27, 1995, entitled "Electrical Power Busway System Connector Joint," commonly assigned to General Electric Company, which is hereby incorporated by reference. The clamping blocks 11 are also used for the insertion of joint cap screws 15, which fasten the joint cap cover connecting the adjacent busway sections to the clamping blocks.

Figure 2:
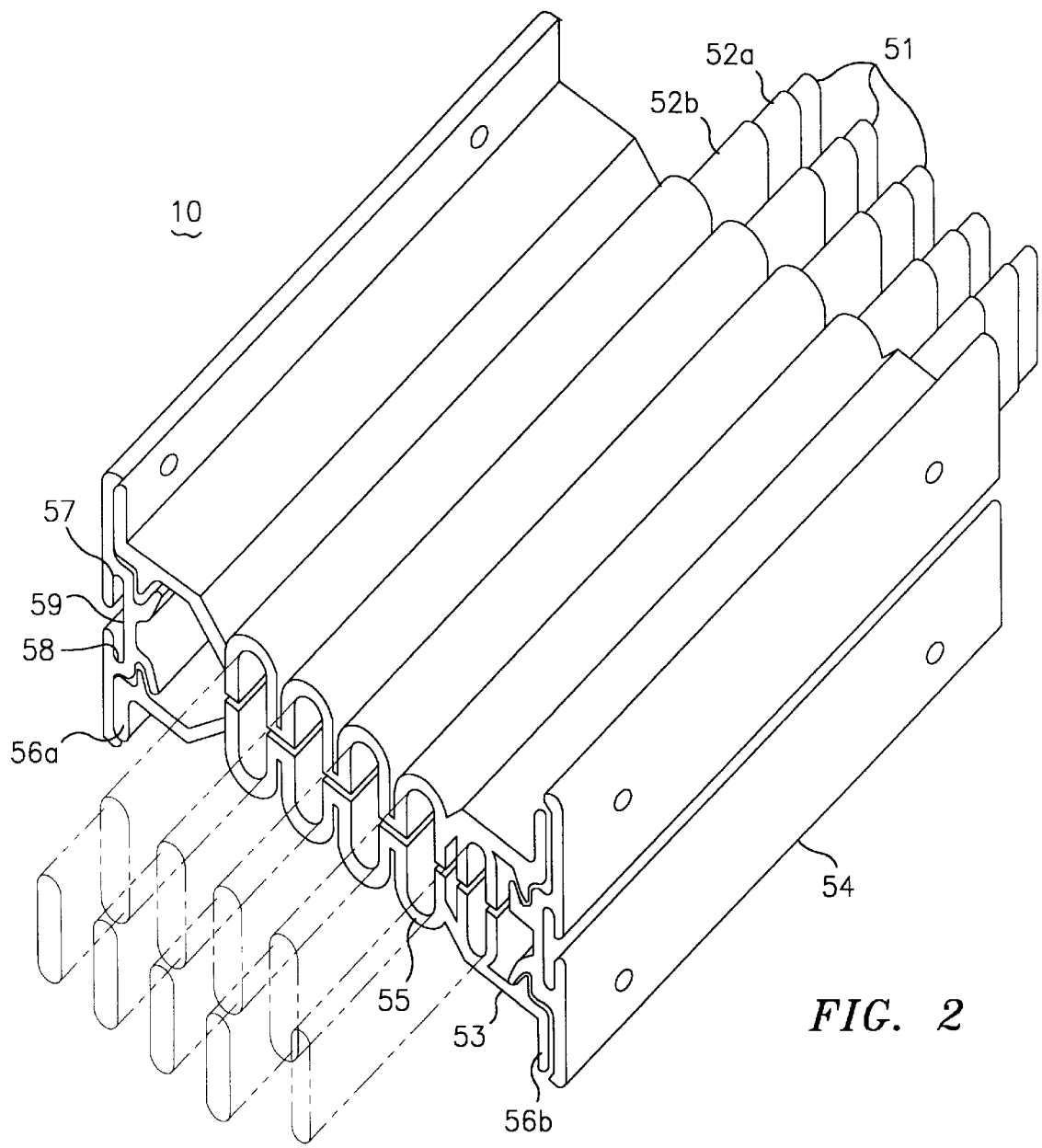
FIG. 2 is an isometric view of the housing section and the bus bars within as assembled together, showing the protective insulator sheet and the bus bar support sections of the bus bar housing in accordance with the invention.

FIG. 2 shows an electric power busway section 10 including a housing assembly and a plurality of bus bars 51 coated with an insulator 52a such as epoxy or other non-conductive materials and protected by a plastic insulation protection sheet 52b. The protection sheet 52b is sandwiched between the insulated bus bars and the housing assembly, conforming to the shape of the housing assembly. The protection sheet is made out of a polymeric film material, which includes, but is not limited to plastic films such as Valox® FR-1 film, polycarbonate films such as Lexan® FR-700 or Lexan® FR-6X, polyetherimide films such as Ultem® 1000 or Ultem® 5000, polyimide films such as Kapton®, polypropylene films such as Formex™, or aramid paper such as Nomex®. The film thickness can be between 1 to 100 mils (1 mil=0.001 inch), with the preferred thickness at 2–20 mils. The above materials have been found to provide the desired degree of flexibility so as to conform to the surface of the bus bars protected with no air gaps or pockets, as well as the required strength, abrasion, and resistance characteristics. They are economical to use and they also serve as a secondary insulation for the bus bars.

Various methods can be used to make the protective sleeve. Long strips of a polymeric film material can be first extruded to a shape mating the formation of the troughs in the housing assembly, then cut to a desired length matching or exceeding the length of the bus bars. Alternately, the protective sheet can be fabricated by vacuum forming, thermal forming, or die cutting then shaping into form The protection sheet is shaped to mate with the outside extruded housing assembly, which consists of a side plate 53 and a rail 54 positioned opposite a complementary side plate and rail. The side plates are shaped with troughs 55 to hold the bus bars in place. The side plates and rails are formed from an aluminum alloy that is lightweight and exhibits excellent thermal and electrical conductive properties. The trough-shaped side plates extend perpendicular to a top flange 56a and a bottom flange 56b. The rail pieces each comprises a flat plate 59 extending perpendicular to cross flanges 58, and which extend to top flanges 57. The flanges provide added structural support to the housing section and increase outside surface area for improved thermal convection and radiation to the surrounding air.

Figure 3A:
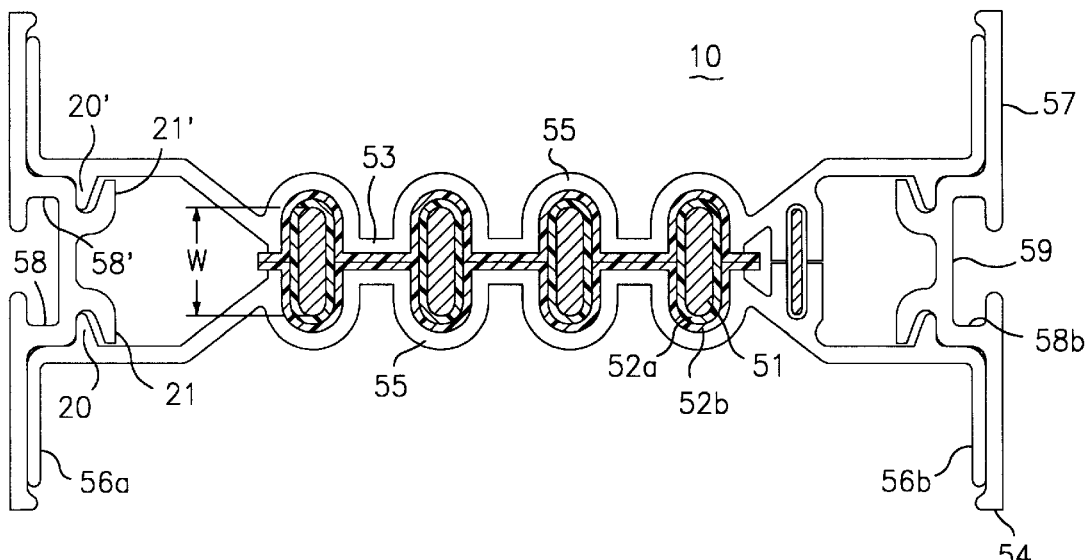
FIG. 3A and 3B are cross-sectional views of the busway section in FIG. 2.

As seen in FIG. 3A, an angulated projection 20 extends from the edge of the top flange 56a to receive a complementary locking groove 21 which extends linearly from cross flange 58.

A similarly angulated projection 20' is formed at the opposite edge of the top flange to receive a complementary locking groove 21', which extends linearly from cross flange 58'. Two similar angulated projections are formed on the opposite-facing cross flange and receiving similarly complementary locking grooves. The snap-fit relationship between the angulated projections and the locking grooves provides increased strength to the busway housing unit.

Figure 3B:
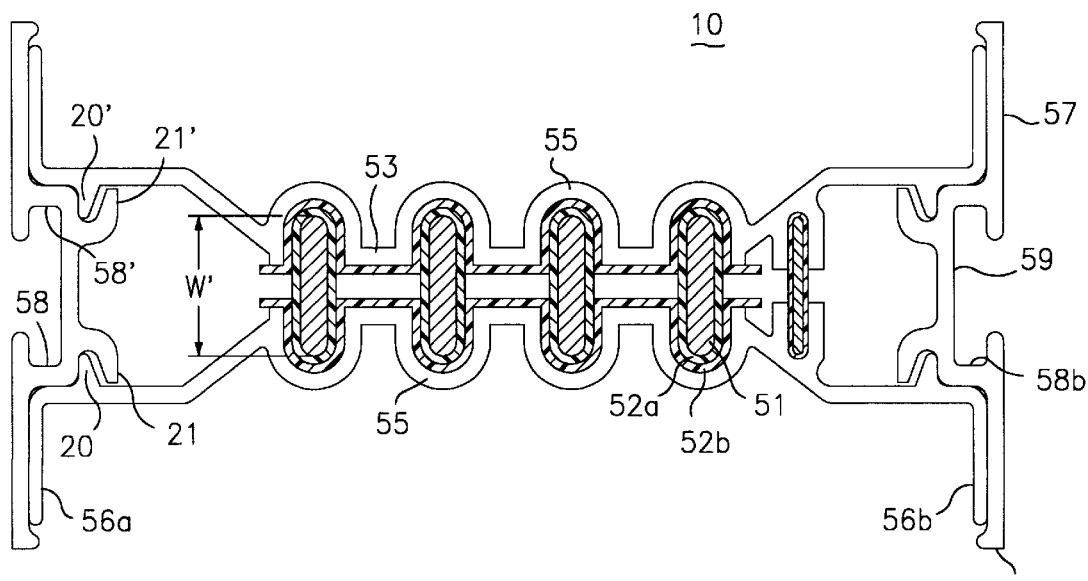

FIG. 3B shows that as the width W' of the bus bars changes, the rail housing size changes accordingly to accommodate the size of the bus bars 51.

Figure 4:
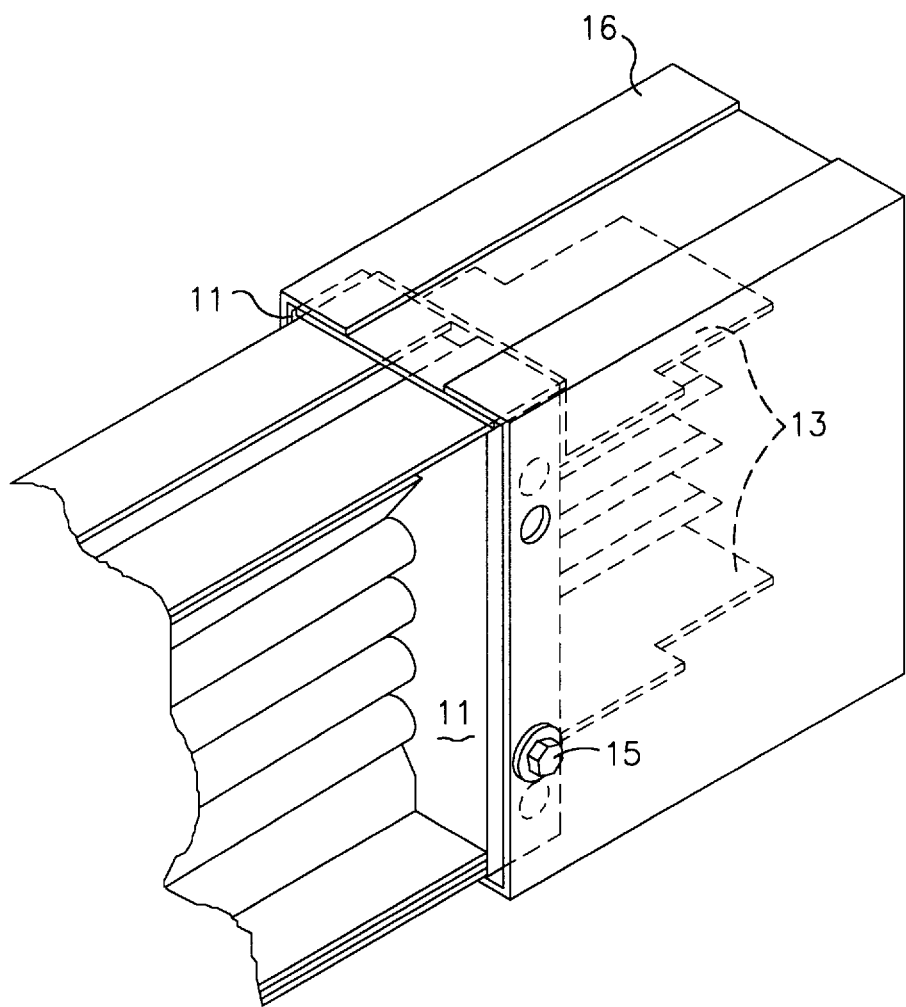
FIG. 4 is an isometric view of one end of a busway section, showing a safety end-box connected to the integral busway clamping mechanism as in FIG. 1.

FIG. 4 shows the end of a busway section with a clamping block 11 (in phantom) and an end box 16. The end box 16 is attached to the end of the busway run via the joint cap screws 15 of the clamping block 11. Joint sides 13 are attached to the clamping block to prevent accidental contacts with the bus bars within the end box.

Figure 5:
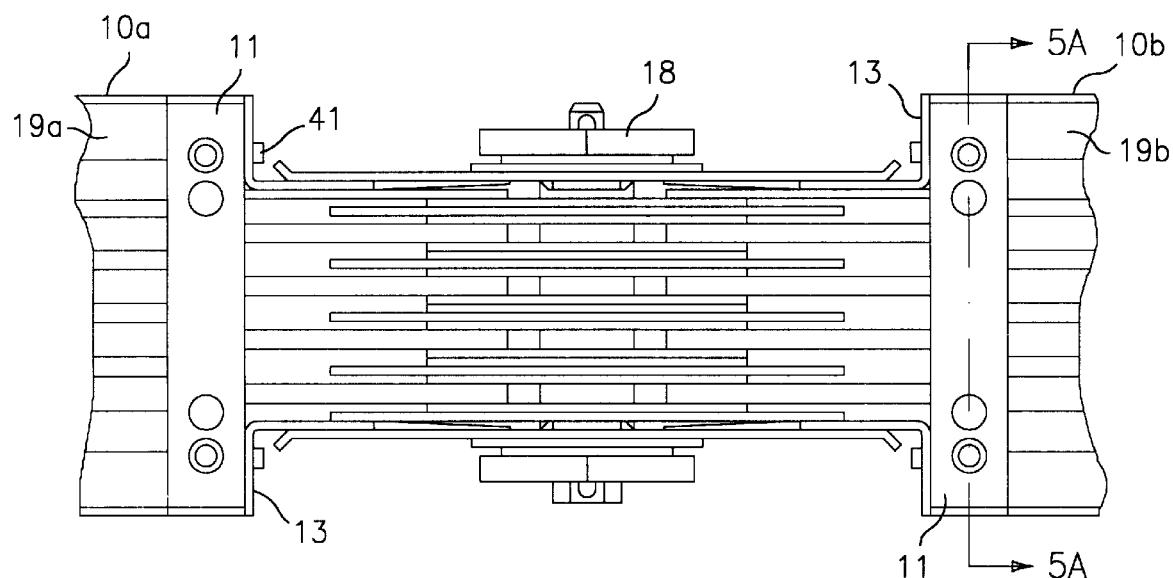
FIG. 5 is a side view of a joint connecting the ends of two adjoining busway sections utilizing the integral busway clamping mechanism of the instant invention.

FIG. 5 shows how the clamping mechanism of the instant invention also functions as a ground conductor. The clamping blocks as attached to the two ends of a busway section act as a connector interface for busway joint attachments. The two separate busway sections 19A and 19B are electrically and mechanically connected to, one another through a joint 18, such as a splice-plate joint described in the aforementioned U.S. patent application Ser. No. 08/411,256. Joint side screws 41 connect the clamping blocks 11 with the joint sides 13. The splice-plate joint 18 functions as a conductor that electrically connects the joint sides 13 which are connected to the two clamping blocks 11 of the two separate sections 19A and 19B. Ground continuity is provided running from the left busway section 19A to the right busway section 19B through the metallic housing 10A and 10B of the two busway sections, the clamping blocks 11, the metallic joint sides 13 which intimately contact the clamping blocks 11, and the splice-plate joint which connects the joint sides 13.

Figure 5A:
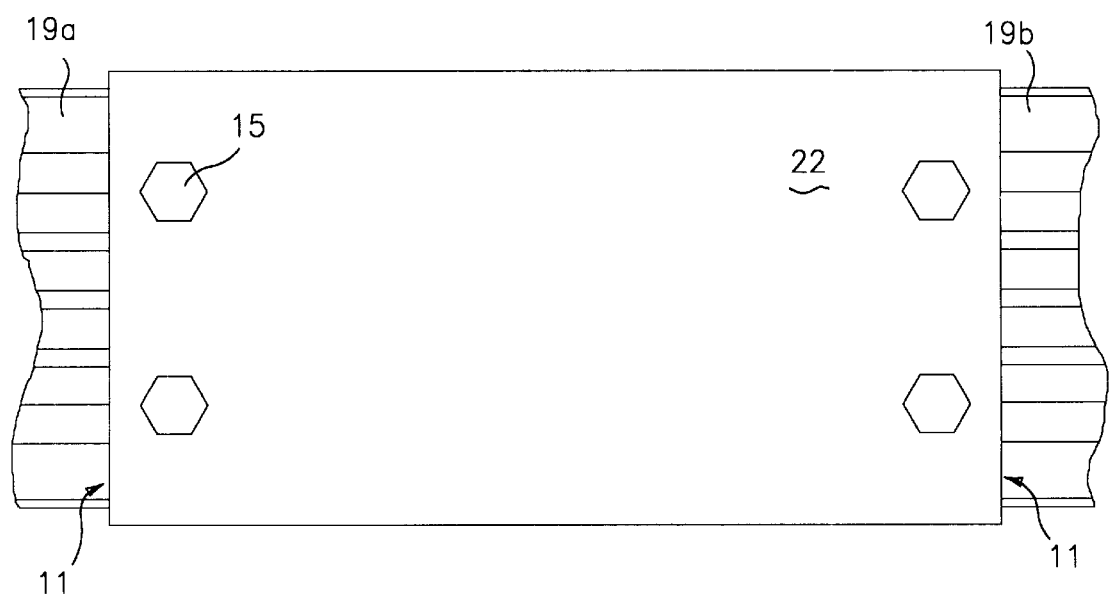
FIG. 5A is a top plan view of the joint in FIG. 5 as covered by a joint cap cover connecting the two adjoining busway sections.

Additional ground connectivity is achieved through the clamping blocks 11 via the joint cap cover 22 as shown in FIG. 5A. Each joint cap cover 22 is fastened to the clamping blocks 11 by four joint cap screws 15, two each fastening the cap cover to busway sections 19A and 19B respectively. Ground connectivity is carried across the busway connection through the intimate contact between the clamping blocks 11 and the joint cap cover 22. The use of the integral clamping blocks for the connection of the joint cap cover 22 significantly increases strength and rigidity of the connection between the two adjacent busway sections.

Figure 6:
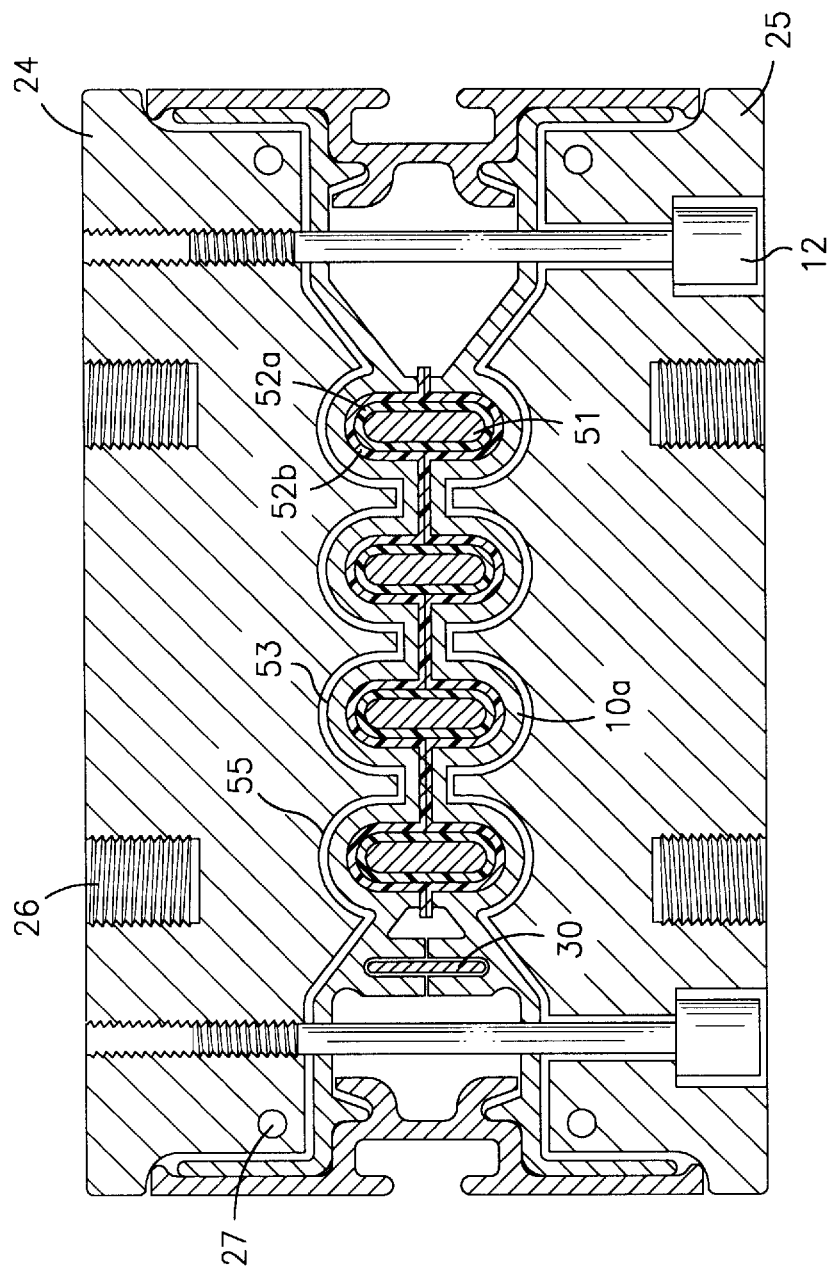
FIG. 6 is a cross-sectional view of the busway section along the line 5A—5A in FIG. 5.

FIG. 6 is a cross-sectional view along the line 5A—5A in FIG. 5, showing the housing assembly structure as well as the attachment method for the integral clamping mechanism in the busway system of the instant invention. The housing unit 10A is sandwiched between two opposite clamping blocks, known as top clamping block 24 and bottom clamping block 25. The solid clamping blocks are formed from an aluminum alloy that exhibits excellent thermal and mechanical properties. The surface of the clamping blocks 11 facing the housing unit 10a is shaped to mate with the side plates of the housing unit sandwiched within. To assemble the busway system utilizing the instant invention, the clamping blocks 24 and 25 are first loosely attached to each other and with the housing unit using one or more fasteners such as clamping screws 12. The clamping screws are tightened to a specified torque requirement to fasten the two clamping blocks, keeping the bus bars 51 and ground bar 30 within from sliding out of the insulative protective sleeve 52B and the housing assembly 10A Ground bar 30 is optional in the instant invention because of the inherent ground conductivity characteristics of the busway system. Joint cap holes 26 are used to connect the joint cap cover 22 (FIG. 5A) between two adjacent busway sections. Joint side holes 27 are for connecting with other mating hardware such as joint sides 13 (FIG. 5) to prevent accidental contacts with the bus bars within.

Figure 7:
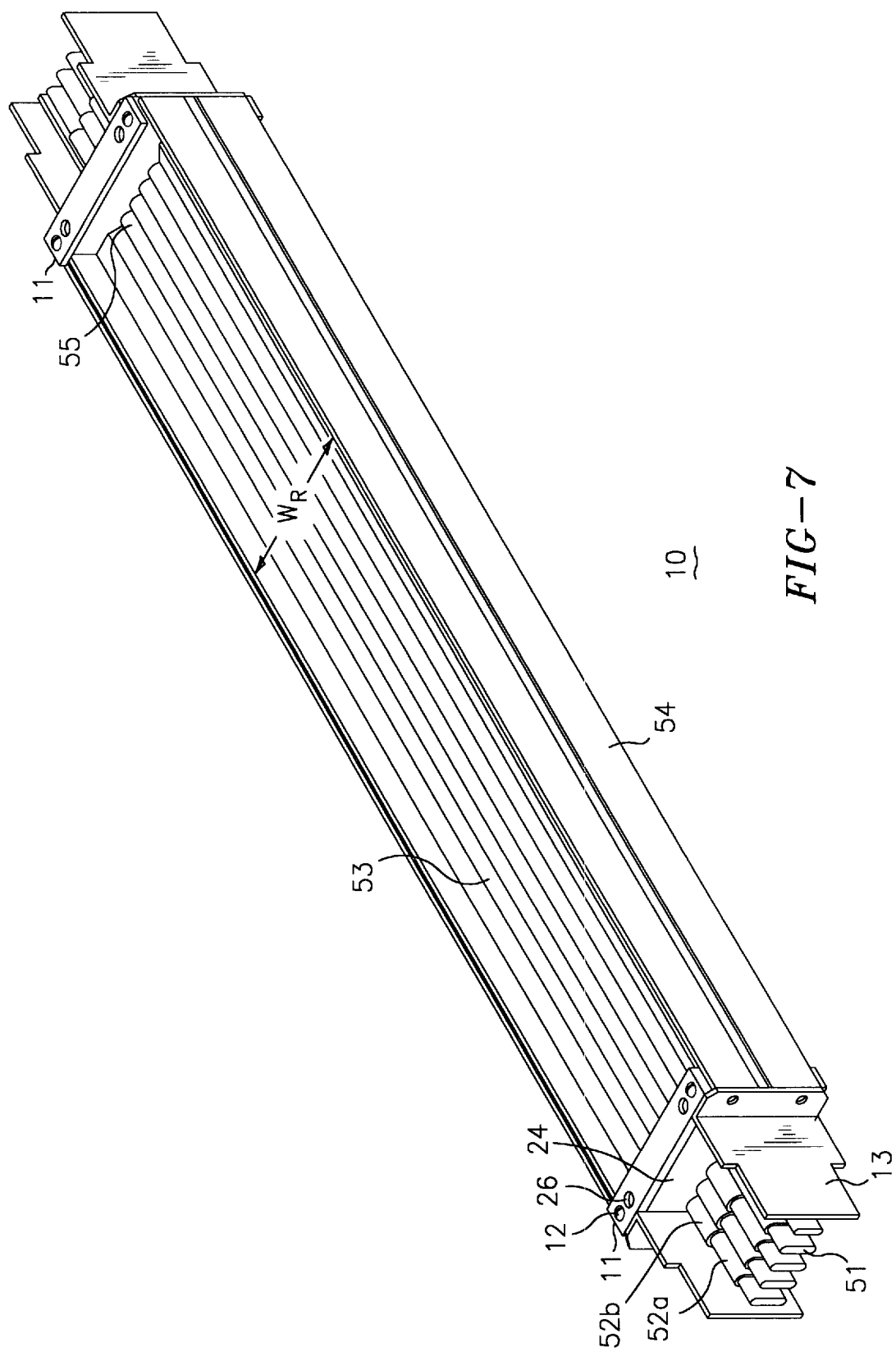
FIG. 7 is an isometric view of a two feeder busway section with a clamping block at each end of the section.

FIG. 7 shows a two-feeder busway section 10 in accordance with the present invention, the housing rail 54 is shaped into troughs 55 to hold the bus bars 51 within. The side rails 54 are formed having a width $W_r$ to accommodate the bus bars within, and the troughs 55 are shaped to accommodate the thickness of the bus bars and the number of bus bars carried by a particular busway system. Clamping blocks 11 are shown at each end of the busway section to keep the bus bars from falling out of the housing unit. One or more fasteners such as clamping screws 12 tightly fasten the top clamping block 24 and the bottom clamping block (not shown) together with the housing unit and the bus bars sandwiched within.

Figure 8:
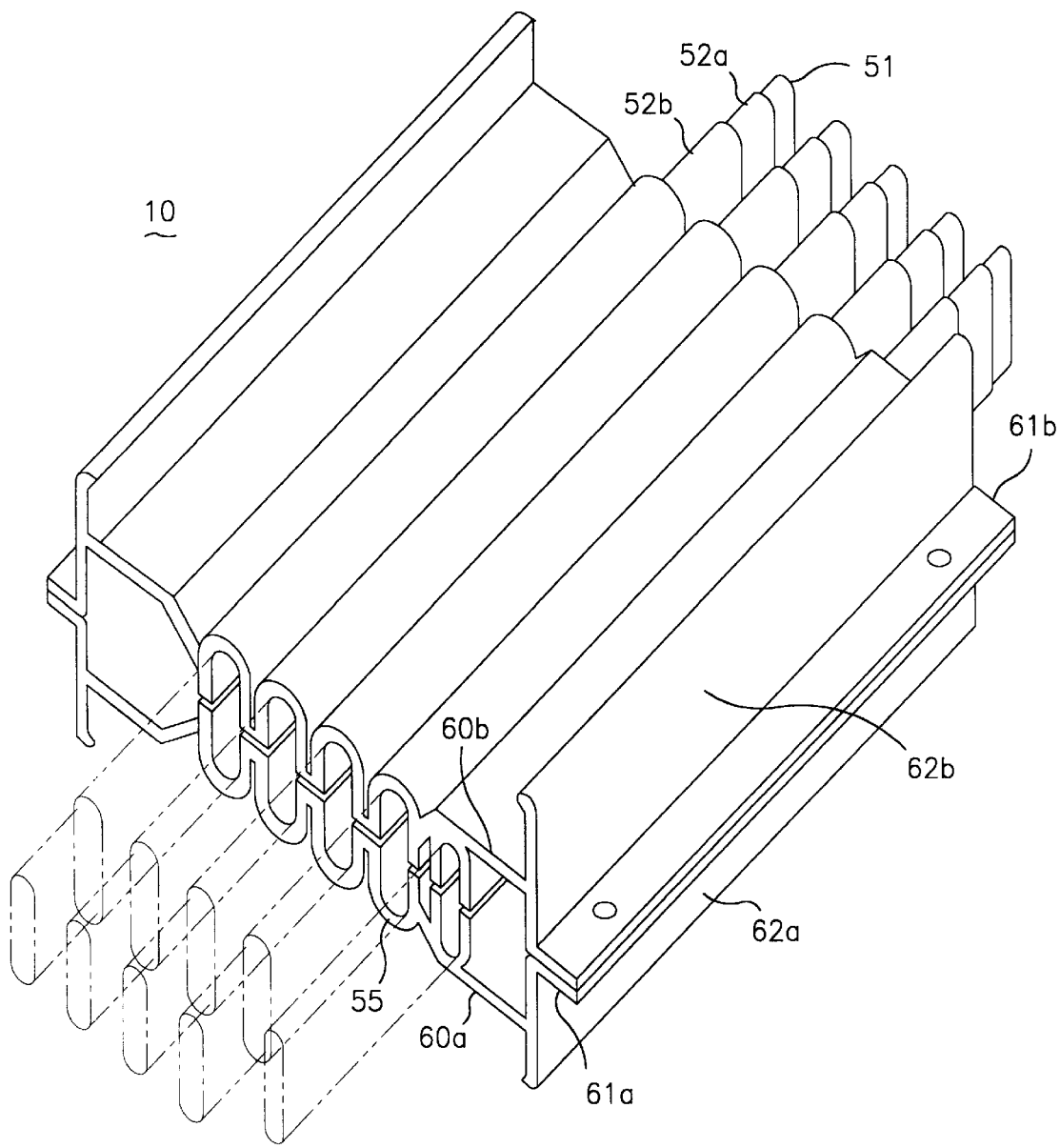
FIG. 8 is an isometric view of the housing section and the bus bars within as assembled together, similar to FIG. 2, illustrating a variation of the instant invention for the housing assembly.

In the second exemplary embodiment of a housing assembly shown in FIG. 8, the electric power busway section 10 includes a housing assembly and a plurality of bus bars 51 coated with an insulator 52a, preferably epoxy or other similar non-conductive materials, and protected by a plastic insulation protection sheet 52b. The housing assembly here consists of two opposing metal plates 60A and 60B. Each metal plate is shaped with troughs 55 to hold the bus bars 51 in place. The metal plates 60A and 60B extend perpendicular to flanges 62A and 62B. The flanges provide added structural support to the housing section and increase outside surface area for improved thermal convection and radiation to the surrounding air. Where opposite flanges 62A and 62B come together, they extend perpendicular to plates 61A and 61B.

FIG. 9A and 9B show a cross section of the busbar in the second exemplary embodiment of FIG. 8. As the width W of the bus bars changes, the size of the top flanges 62A and 62B changes proportionally to accommodate the bus bars 51. The cross section also cuts through a joint where plates 61A and 61B of the two opposing metal housing plates are fastened together.

FIG. 10 is a cross-section view of a joint between the two plates of the housing assembly construction in this instant invention, as between the two metal plates in FIGS. 9A and 9B, or between the housing rail and metal flange in FIG. 2. The joints here are formed together as a solid connection, without the use of fasteners such as bolts, screws, rivets, etc., or the application of heat as in welding. The joints are formed with the top metal plate being extruded or deformly melded into the bottom metal layer, with no through-hole created in the metal surfaces or the joint itself The construction of the housing assembly in the instant invention, with metal plates or rails forming the housing parts, allows for the use of a punch and die tool set for the joints. After the action of the punch and die, a stretched area is formed on one side of the joint via an extrusion, pressing, or drawing compression process.

In a preferred embodiment of the invention, the joints are formed using a punch and die tool set from TOX Corp. of Addison, Ill., as described in U.S. Pat. No. 4,760,634 entitled "Method of Connecting Thin Plates." In this joining process, first the flat metal surfaces are stacked on one another, then the joints are formed in a single and simple operation by the action of the punch and die whereby the punch sinks through the top metal surface into the joining part. Because the top metal plate of the housing part is being deformly melded, or "clinched" or "crimped" into the bottom metal part, a solid joint is formed with no through-hole in the metal itself. With no breakage in the metal surface of the housing parts, the joints formed are watertight and much stronger mechanically than joints formed by other means or through the use of mechanical fasteners.

What is claimed is:

1. An electric power busway system comprising:
    a plurality of electric power bus bars;
    an elongated housing section comprising a pair of opposing metal plates, said plates being shaped with a plurality of troughs, each trough receiving one of said bus bars, said through in said housing section supporting and retaining said bus bars at proper intervals from each other; and
    a fastening member at two opposite edges of each of said housing plates for fastening said plates where said plates come into contact with one another.

2. An electric power busway system comprising:
    a plurality of electric power bus bars;
    an elongated housing section comprising a pair of opposite rail supports and a pair of longitudinally extending opposing plates, said plates being shaped with a plurality of troughs, each trough cooperating with one opposing said trough and receiving one said bus bars, said trough in said housing section supporting and retaining said bus bars at proper intervals from each other; and
    a projection extending linearly from said plates and receiving a complementary locking groove extending linearly from said rail supports for interlocking said rail support and said plates together where said rail supports come in contact with said plates.

3. The busway system of claim 2, wherein said rail supports and plates are extruded.

4. The busway system of claim 2, wherein said rail supports and plates are comprised of non-ferrous metals.

5. The busway system of claim 4, wherein said non-ferrous metals comprise aluminum alloy.

6. An electric power busway system comprising:
    a plurality of electric power bus bars;
    a housing section of a multi-piece metallic construction having a least two separate pieces; and
    joints for fastening pieces of said housing section together where the separate pieces of said housing section are in contact together, said joints having a top surface and a bottom surface being formed using a punch and die tool set, wherein the top surface of the joints are deformly melded into the bottom surface, with no through-hole created in the surfaces of the joints.

7. An electric power busway system comprising:
    a plurality of electric power bus bars;
    an elongated housing section of a multi-piece metallic construction;
    a plurality of troughs on said housing section, each trough cooperating with one opposing said trough to support one of said bus bars, keeping said bus bars at proper intervals from each other;
    a fastening member for fastening the pieces of said housing section together where said pieces come in contact; and
    at least one layer of an insulative protection sleeve covering at least two of said electric power busbars, said sleeve being sandwiched between said bus bars and said housing section primarily where said bus bars come into contact with said housing section, said protection sleeve being made out of a one-piece construction.

8. The busway system of claim 7, wherein said insulative protection sleeve is thermally formed.

9. The busway system of claim 8, wherein said insulative protection sleeve is vacuum formed.

10. The busway system of claim 7, wherein said insulative protection sleeve is fabricated by die cutting and forming.

11. The busway system of claim 7, wherein said insulative protection sleeve is extruded and cut to length.

12. The busway system of claim 7, wherein said insulative protection sleeve comprises a polymeric material.

13. The busway system of claim 12, wherein said polymeric material is a thermoplastic film selected from the group consisting of: polycarbonate films, polyetherimide films, polyimide films, polyalkylene films, aramid containing films, and blends or combinations thereof.

14. The busway system of claim 7, wherein the thickness of said insulative protection sleeve is between about 1 and 100 mils.

15. The busway system of claim 7, wherein the thickness of said insulative protection sleeve is between about 2 and 20 mils.

16. An electric power busway system comprising:
   a plurality of electric power bus bars;
   an elongated housing section of a multi-piece metallic construction;
   troughs on said housing section to support said bus bars, keeping said bars at proper intervals from each other; and
   at least one pair of opposing first and second clamping blocks and a fastener extending through said opposing first clamping block, said housing section and said opposing second clamping block, said fastener directly clamping and applying friction on said housing section to keep said bus bars from sliding out of said housing section.

17. The busway system of claim 16, wherein said fastener comprises two pairs of clamping screws.

18. The busway system of claim 16, wherein said clamping blocks are comprised of non-ferrous metals.

19. The busway system of claim 18, wherein said non-ferrous metals comprise aluminum alloys.

20. The busway system of claim 16, further comprising:
   a second housing section;
   a joint piece connecting said first housing section to said second housing section;
   a connector for connecting a first pair of clamping blocks located at the end of said first housing section to said joint piece and connecting said first pair of clamping blocks to said second housing section, said connector comprising a plurality of attachment devices providing internal ground conductivity across said first housing section and said joint piece via said first pair of clamping blocks.

21. The electrical power busway system of claim 20, wherein said attachment devices comprises plurality of joint sides, joint covers and screws.

22. The busway system of claim 20, wherein the end of said second housing section adjacent to said joint piece is clamped by a second pair of clamping blocks.

23. The electrical power busway system of claim 22, further comprising
   a second connector to connect said joint piece to said second pair of clamping blocks of said second busway section, said second connector comprising a plurality of joint sides, joint covers and screws providing internal ground conductivity across said adjacent first and second busway sections through said first and second pair of clamping blocks and said joint piece.

* * * * *